(12) United States Patent
Wilson (10) Patent No.: US 7,841,158 B2
(45) Date of Patent: Nov. 30, 2010

(54) UNIVERSAL YOKE ASSEMBLY FOR A TURF MAINTENANCE VEHICLE

(75) Inventor: Kenneth R. Wilson, Stanley, NC (US)

(73) Assignee: Textron Innovations Inc., Providence, RI (US)

( * ) Notice: Subject to any disclaimer, the term of this patent is extended or adjusted under 35 U.S.C. 154(b) by 282 days.

(21) Appl. No.: 12/033,285

(22) Filed: Feb. 19, 2008

(65) Prior Publication Data
US 2009/0206576 A1 Aug. 20, 2009

(51) Int. Cl.
*A01D 75/30* (2006.01)

(52) U.S. Cl. ............................................................ 56/7

(58) Field of Classification Search ........................ 56/2, 56/7, 14.9, 15.5
See application file for complete search history.

(56) References Cited

U.S. PATENT DOCUMENTS

| 3,090,184 | A | * | 5/1963 | Hadek ................................ 56/7 |
| 3,514,926 | A | | 6/1970 | Heth et al. |
| 5,069,022 | A | * | 12/1991 | Vandermark ...................... 56/6 |
| 5,199,250 | A | * | 4/1993 | Ermacora et al. ............. 56/15.2 |
| 5,459,984 | A | * | 10/1995 | Reichen et al. .................... 56/7 |
| 5,623,817 | A | | 4/1997 | Bricko et al. |
| 5,865,016 | A | * | 2/1999 | Toman ............................... 56/7 |
| 6,131,378 | A | * | 10/2000 | Lees ................................. 56/7 |
| 6,237,313 | B1 | * | 5/2001 | Leden ........................... 56/199 |
| 6,341,478 | B1 | * | 1/2002 | Sallstrom et al. .................. 56/7 |
| 6,557,334 | B2 | * | 5/2003 | Jager ............................. 56/294 |
| 6,698,170 | B2 | * | 3/2004 | Tironi ................................ 56/6 |
| 7,331,166 | B2 | * | 2/2008 | Phillips ............................. 56/7 |
| 7,398,637 | B1 | * | 7/2008 | Sevey ........................... 56/14.9 |
| 7,568,331 | B2 | | 8/2009 | Reichen et al. |
| 2002/0184866 | A1 | * | 12/2002 | Doerflinger ....................... 56/7 |

OTHER PUBLICATIONS

European Search Report for European Patent Application No. EP09150404 dated May 14, 2009.

* cited by examiner

*Primary Examiner*—Thomas B Will
*Assistant Examiner*—Mai T Nguyen
(74) *Attorney, Agent, or Firm*—Harness, Dickey & Pierce, P.L.C.

(57) ABSTRACT

A universal attachment assembly is operable to couple turf maintenance implements of varying widths to a turf maintenance vehicle. The attachment assembly can include a yoke member that can be attached to a coupling member in various locations. The different locations can accommodate varying widths of the turf maintenance implements that are coupled to the turf maintenance vehicle with the yoke member. The yoke member can also be positioned in different orientations relative to the coupling member in both the first and second positions. The different orientations can correspond to an operating position and a servicing position for the turf maintenance implement.

33 Claims, 10 Drawing Sheets

UNIVERSAL YOKE ASSEMBLY FOR A TURF MAINTENANCE VEHICLE

FIELD

The present teachings relate to turf maintenance vehicles and, more particularly, to a turf maintenance vehicle and a yoke assembly allowing the interchanging of turf maintenance implements of varying widths.

BACKGROUND

The statements in this section merely provide background information related to the present teachings and may not constitute prior art.

Turf maintenance vehicles, such as riding greens mowers, are typically configured with 22-inch turf maintenance implements, with no availability of coupling 18-inch turf maintenance implements thereto. When a surface being mowed, such as a golf course greens, has an undulated surface, the preferred turf maintenance implement width is 18 inches. Due to the unavailability of coupling the 18-inch turf maintenance implement to the riding greens mower, a user must utilize a walking mower which utilizes the 18-inch turf maintenance implement. The requirement to use the walking mower instead of the riding greens mower increases the man power/labor costs to mow the greens. Thus, it would be advantageous to have the ability to install turf maintenance implements of varying widths onto a riding greens mower.

SUMMARY

A universal attachment assembly according to the present teachings can allow for coupling of turf maintenance implements of varying widths to a turf maintenance vehicle, such as a riding greens mower by way of non-limiting example. The attachment assembly allows for the use of a yoke member that can be coupled to a coupling member in various positions. The various positions can correspond to accommodating turf maintenance implements of varying widths. This capability can facilitate the changing of turf maintenance implements of varying widths to perform differing tasks. The attachment assembly allows the turf maintenance implements of varying widths to be attached in an orientation that accommodates the differing widths and provides proper alignment on the turf maintenance vehicle and/or with other turf maintenance implements also mounted to the turf maintenance vehicle. Additionally, the attachment assembly can allow the turf maintenance implements to be positioned in different orientations to allow for operation of the turf maintenance implement and to allow for service of the turf maintenance implement. This capability can facilitate the servicing of the turf maintenance implement.

An attachment assembly for a turf maintenance vehicle according to the present teachings can include a yoke member and a coupling member. The yoke member can have first and second connecting features with the first connecting feature operable to connect the yoke member to a turf maintenance implement. The coupling member is operable to couple the yoke member to a frame assembly. The coupling member can include a first attachment feature that can be coupled to the frame assembly and a second attachment feature that engages with the second connecting feature, thereby coupling the yoke member to the coupling member. The second attachment feature allows the yoke member to be coupled to the coupling member in at least two positions. A first one of the at least two positions corresponds to the yoke member being in a first orientation relative to the coupling member, while a second one of the at least two positions corresponds to the yoke member being in a second orientation relative to the coupling member. The first and second orientations are different.

In another aspect, a turf maintenance vehicle according to the present teachings includes a frame assembly, a power unit coupled to the frame assembly, at least two wheels coupled to the frame assembly, and an attachment assembly. The attachment assembly is operable to couple turf maintenance implements of varying widths to the frame assembly.

In yet another aspect of the present teachings, an attachment assembly for a turf maintenance vehicle includes a yoke member and a coupling member. The yoke member has first and second connecting features with the first connecting feature operable to connect the yoke member to a turf maintenance implement. The coupling member couples the yoke member to a turf maintenance vehicle frame assembly with a first attachment feature. The coupling member can include a second attachment feature that engages with the second connecting feature, thereby coupling the yoke member to the coupling member. The second attachment feature and the second connecting feature allow the yoke member to be coupled to the coupling member at two different locations on the coupling member and in at least two different orientations at each of the two locations.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present disclosure in any way.

DETAILED DESCRIPTION

The following description is merely exemplary in nature and is not intended to limit the present teachings, applications, or uses. It should be understood that throughout the drawings, corresponding reference numerals indicate like or corresponding parts and features (e.g., 20, 120, 220, etc.).

Figure 1:
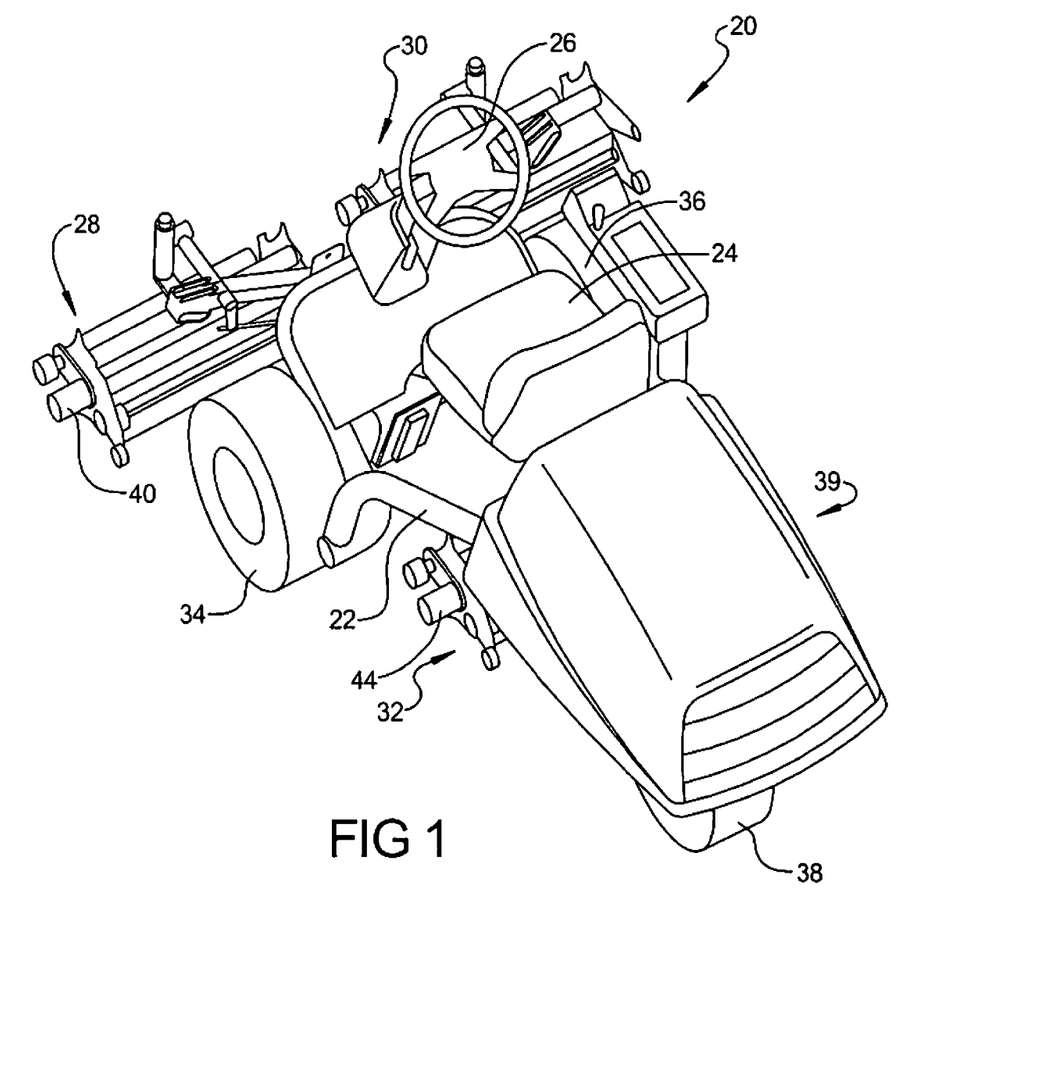
FIG. 1 is a perspective view of a turf maintenance vehicle utilizing the universal yoke according to the present teachings.

FIG. 1 shows a turf maintenance vehicle assembly 20, in this case in the form of a riding greens mower, including a frame 22 supporting a seat 24 operable to support a passenger, a steering device 26, such as a steering wheel, and a plurality of turf maintenance implements, such as cutting units, 28, 30, 32. It should be noted that while the present teachings will be described with respect to a riding greens mower, one skilled in the art will recognize that teachings described herein are equally applicable to any walking and/or riding turf maintenance vehicle for which it may be generally desirable to change implements. Front wheels 34, 36 and rear wheel 38 are rotatably connected to frame 22 and used to propel and/or steer mower assembly 20. Power unit 39 is connected to and supported by frame 22. Power unit 39 provides power to rotate one or more of wheels 34, 36, 38. Power unit 39 may supply power to electric motors to drive various wheels, may provide power to a hydraulic pump outputting pressurized hydraulic fluid, or may drive various wheels directly or indirectly using a mechanical transmission, by way of non-limiting example. When using pressurized hydraulic fluid, the fluid drives a hydraulic motor(s) at the driven wheel(s). A speed control device (not shown), such as a foot-controlled pedal, is provided to control a forward or reverse speed of mower assembly 20.

Power unit 39 can also be coupled to a plurality of motors 40, 44, each connected to one of the turf maintenance implements 28, 32, respectively (the motor for turf maintenance implement 30 is not shown), shown in various embodiments as reel and rotary mowers or cutting units. Power unit 39 may provide electrical energy to electric motors or, alternatively, may provide pressurized hydraulic fluid to hydraulic motors to provide the rotating drive force to operate turf maintenance implements 28, 30, 32.

Figure 2:
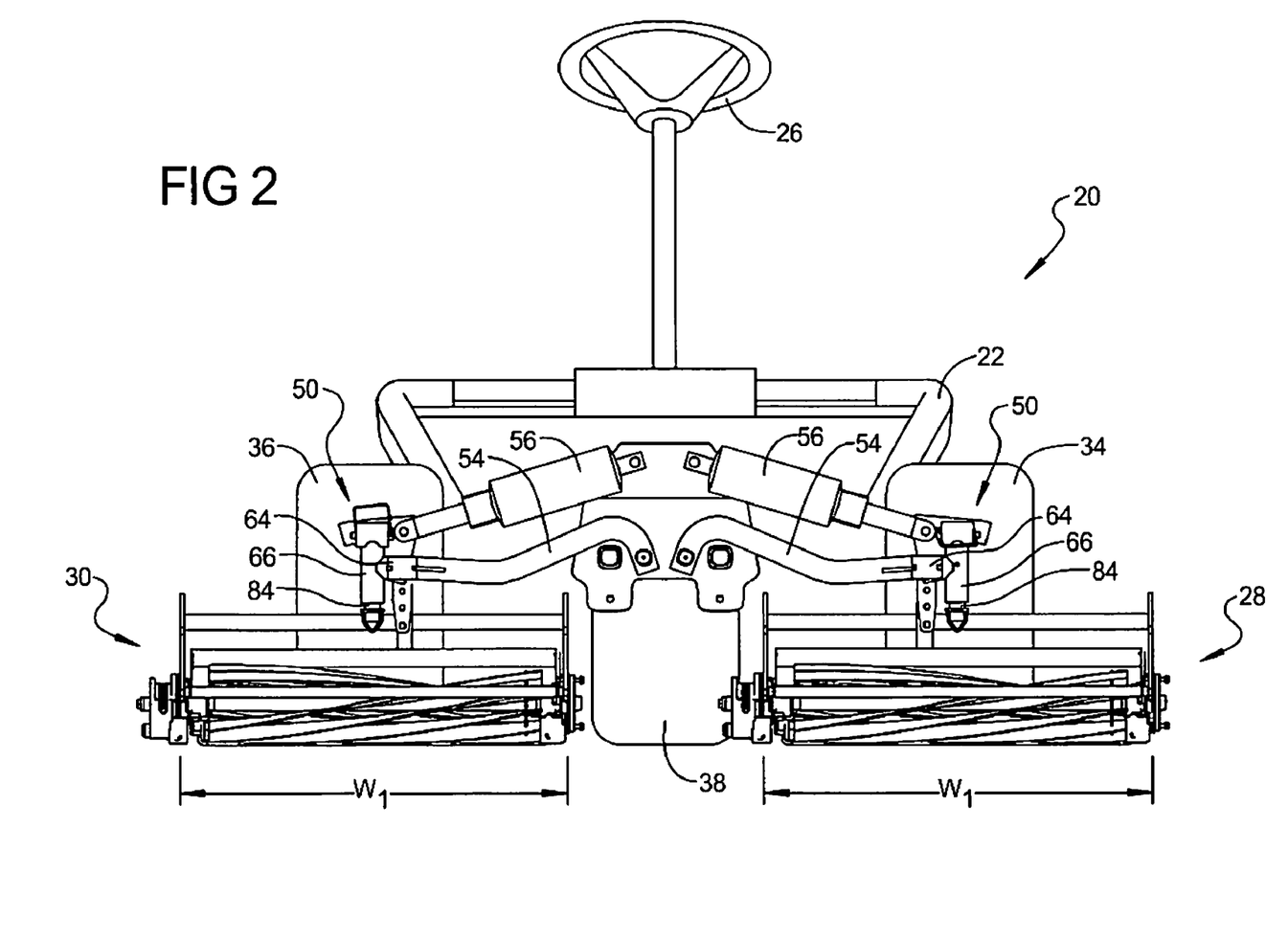
FIG. 2 is a simplified front plan view of the turf maintenance vehicle of FIG. 1 with various components removed and with a first pair of turf maintenance implements having a first width coupled thereto with the universal yoke.

Referring now to FIGS. 1-7, details of the coupling of front turf maintenance implements 28, 30 to mower assembly 20 with universal attachment assemblies 50 according to the present teachings are shown. In FIGS. 1 and 2, turf maintenance implements 28, 30 each have a first width $W_1$, while in FIGS. 3 and 4, front left and right turf maintenance implements 128, 130 each have a second width $W_2$ which is less than first width $W_1$. For example, first width $W_1$ can be about 22 inches, while second width $W_2$ can be about 18 inches. Attachment assembly 50 enables turf maintenance implements of either width $W_1$ or width $W_2$ to be quickly and easily attached to mower assembly 20 and be oriented in the proper position for operation. For example, the first group of turf maintenance implements 28, 30 can be wider and used for cutting fairways and flat greens. When encountering undulating greens, however, the second set of turf maintenance implements 128, 130 having a smaller second width $W_2$ can be attached to mower assembly 20 for operation on these surfaces. The ability to easily and quickly change between turf maintenance implements of varying widths can increase productivity and efficiency along with reducing the manpower required to maintain a turf surface, such as a golf course.

Figure 5:
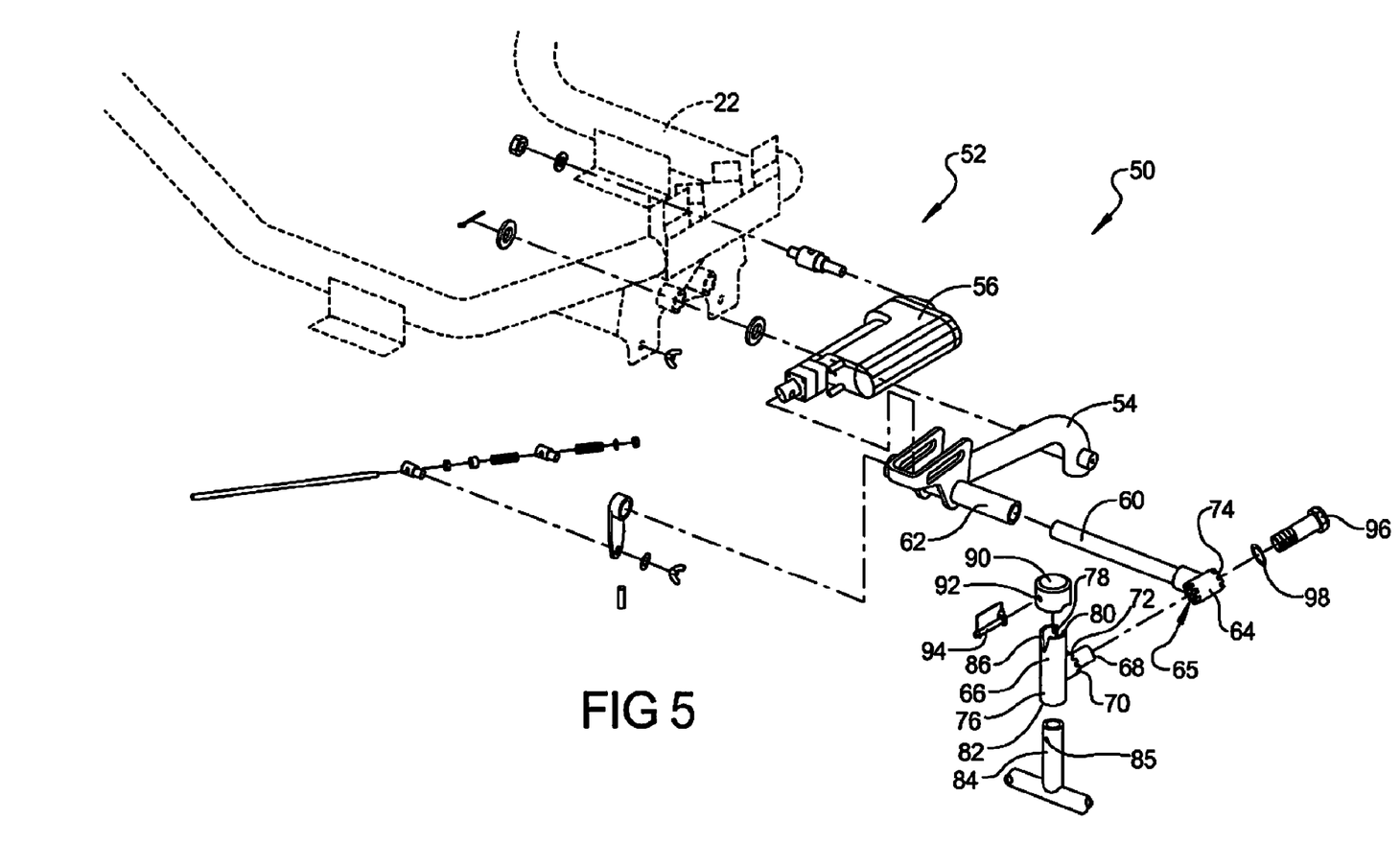
FIGS. 5 and 6 are respective fragmented assembly views of the respective front right and front left lift systems for the turf maintenance implements for the turf maintenance vehicle of FIG. 1.
Figure 6:
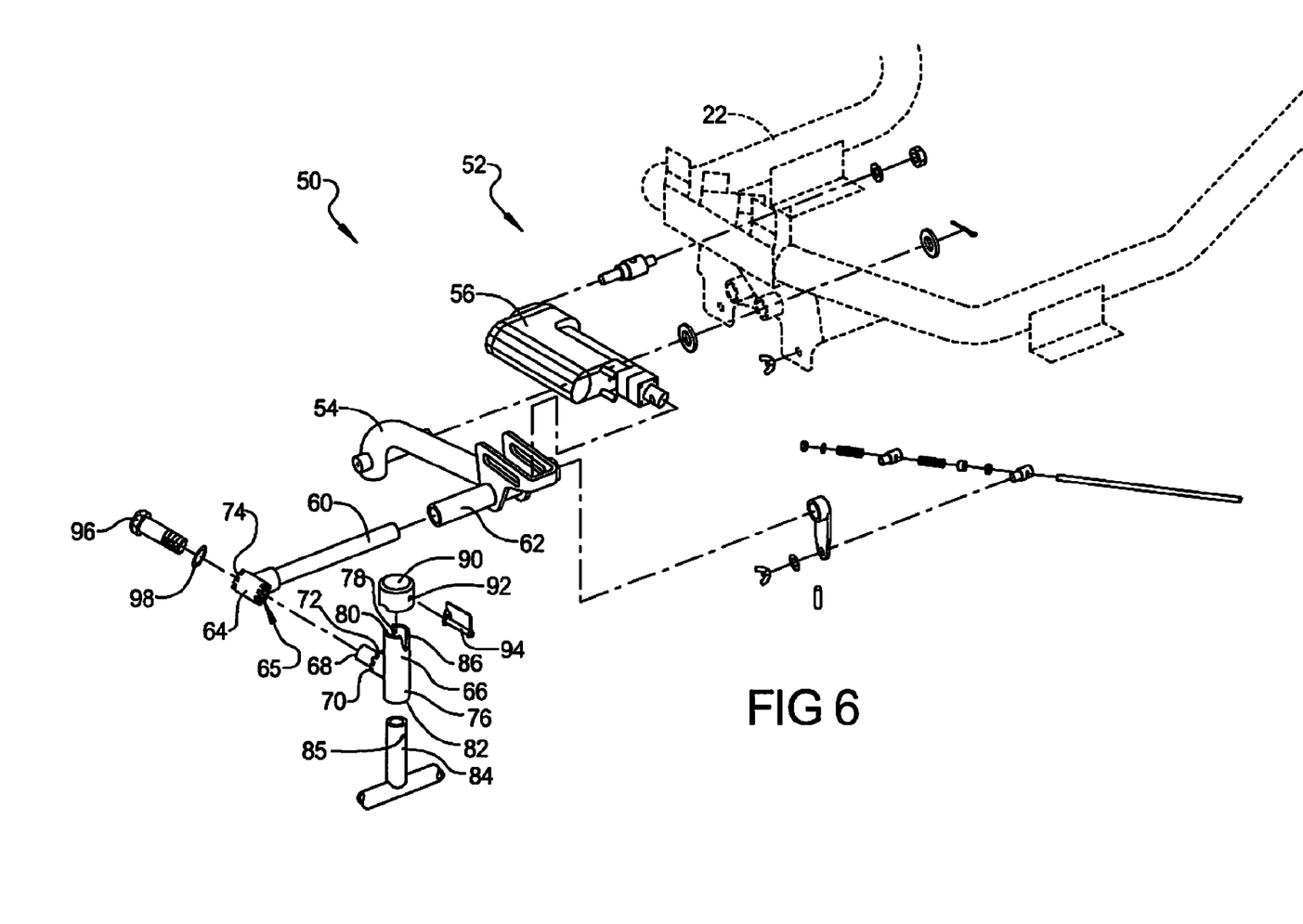
Figures 7A, 7B:
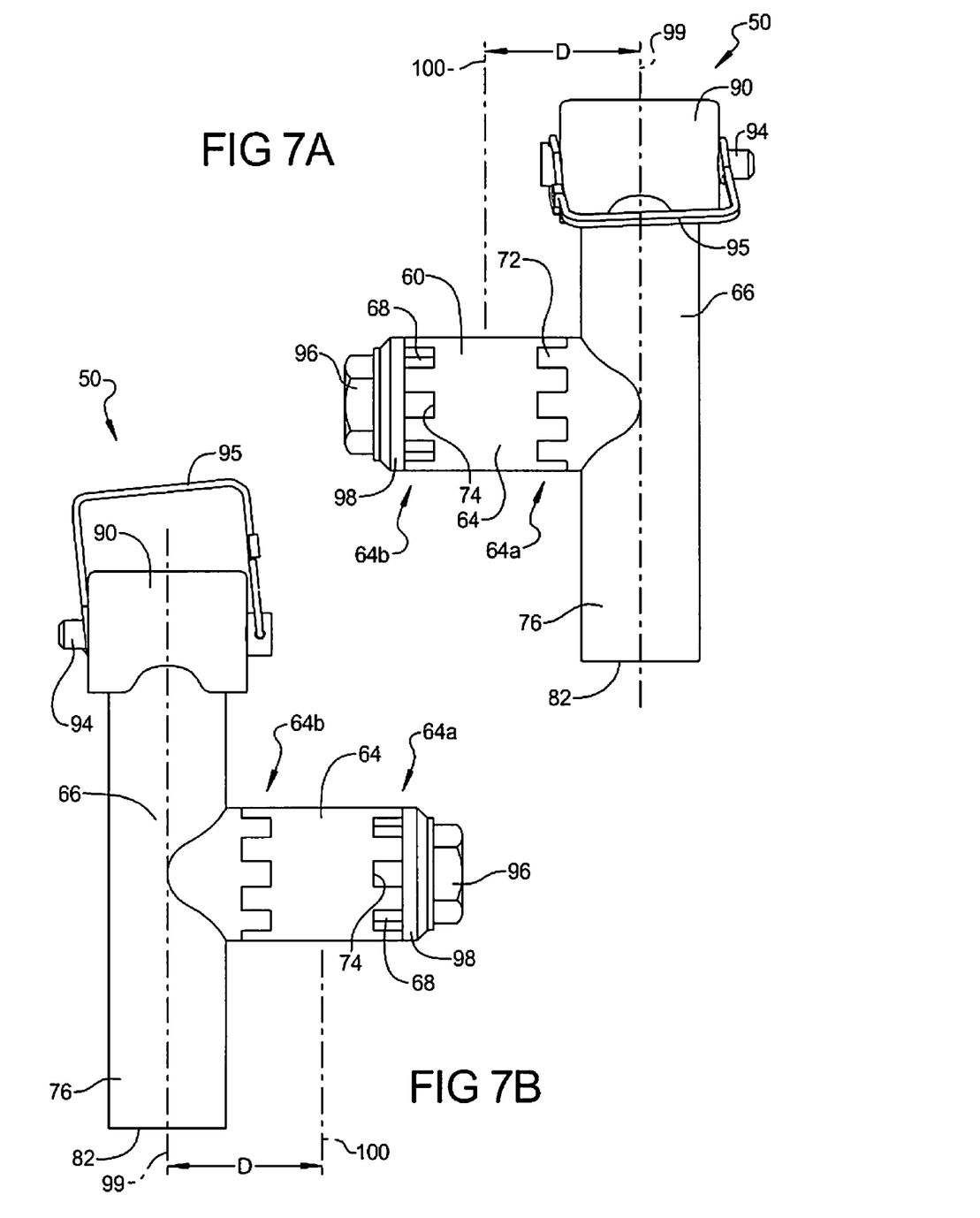
FIGS. 7A and 7B are enlarged front plan views of the universal yoke utilized in the turf maintenance vehicle of FIG. 1 in two different operating positions for coupling turf maintenance implements of differing widths to the turf maintenance vehicle.

Referring now to FIGS. 5-7, details of the respective right and left lift systems 52 having universal attachment assemblies 50 according to the present teachings are shown. Lift systems 52 include a lift arm weldment 54 which is pivotally coupled to frame 22. An actuator 56, such as an electric or hydraulic actuator, is coupled to an end of lift arm 54. Actuator 56 is operable to cause lift arm 54 to rotate relative to frame 22 to raise and lower a turf maintenance implement coupled thereto. Specifically, one end of actuator 56 is pivotally coupled to frame 22, while the other end of actuator 56 is pivotally coupled to an end of lift arm 54. Extension and retraction of actuator 56 can thereby cause lift arm 54 to rotate relative to frame 22 to selectively raise and lower a turf maintenance implement coupled thereto by attachment assembly 50.

Attachment assembly 50 includes a connecting arm 60 that is rotatably received in and extends through a sleeve 62 of lift arm 54. Connecting arm 60 can rotate relative to lift arm 54 to allow the attached turf maintenance implement to pivot relative to mower assembly 20 and accommodate undulating surfaces. Connecting arm 60 includes a connecting sleeve 64 on an end thereof. Connecting sleeve 64 includes an opening 65 that extends entirely therethrough and can be generally perpendicular to the elongated main body of connecting arm 60. Connecting sleeve 64 is operable to receive a yoke member 66 therein. Yoke member 66 can be received in either end 64a, 64b of connecting sleeve 64. Yoke member 66 includes an insertion extension 68 that is dimensioned to be received in opening 65 through either end 64a, 64b of connecting sleeve 64. Insertion extension 68 includes a shoulder 70 that limits the distance insertion extension 68 can be inserted into opening 65 in connecting sleeve 64. Shoulder 70 can include a plurality of notches 72 therein. Similarly, ends 64a, 64b of connecting sleeve 64 can also include a plurality of notches 74 that are complementary to notches 72. The engagement of notches 72 on yoke member 66 with notches 74 on connecting sleeve 64 prevents relative rotation therebetween, as described below.

Yoke member 66 includes a receiving sleeve 76 with an opening 78 extending all the way therethrough from a first end 80 to a second end 82. Receiving sleeve 76 can be generally perpendicular to insertion extension 68. Opening 78 in receiving sleeve 76 is dimensioned to receive a connecting component 84 of a turf maintenance implement. First end 80 of receiving sleeve 76 includes a pair of opposed notches 86. Notches 86 can be generally V-shaped. Second end 82 of receiving sleeve 76 can be generally flat.

A cap 90 with opposed openings 92 extending through the sidewall and a locking pin 94 can be used to secure a turf maintenance implement to yoke member 66. Locking pin 94 is configured to extend through openings 92 in cap 90 and through an opening 85 in connecting component 84 of the turf maintenance implement to couple the turf maintenance implement to yoke member 66. Clip 95 can prevent locking pin 94 from being removed from cap 90 and connecting component 84 of the turf maintenance implement. Locking pin 94 can reside within notches 86, thereby preventing the turf maintenance implement secured to yoke member 66 from falling out of yoke member 66. Cap 90 can prevent debris and other contaminants from entering into opening 78 in yoke member 66.

Yoke member 66 is secured to connecting arm 60 with a bolt 96 and washer 98. Bolt 96 is threaded and is received in a complementary threaded bore in the end of insertion extension 68. The engagement between bolt 96 and the threaded bore in the end of insertion extension 68, along with the engagement between washer 98 and an end of connecting sleeve 64, prevents yoke member 66 from being removed from connecting sleeve 64 and connecting arm 60. The engagement of notches 72, 74 prevents relative rotation between connecting arm 60 and yoke member 66.

Referring now to FIGS. 7A and 7B, the ability of yoke member 66 to be attached to connecting arm 60 on either end 64a, 64b of connecting sleeve 64 is illustrated. As shown in FIG. 7A, insertion extension 68 of yoke member 66 can be inserted into connecting sleeve 64 through end 64a. Bolt 96 and washer 98 can engage the other end 64b of connecting sleeve 64 to secure yoke member 66 to connecting sleeve 64. Alternatively, as shown in FIG. 7B, yoke member 66 can be inserted into connecting sleeve 64 through end 64b. Bolt 96 and washer 98 can engage with end 64a of connecting sleeve 64 to secure yoke member 66 to connecting sleeve 64 of connecting arm 60. Thus, the attachment assembly 50 according to the present teachings enables yoke member 66 to be attached to either end 64a, 64b of connecting sleeve 64. As a result of this capability, yoke member 66 can be disposed on either side of connecting arm 60. This allows for the centerline 99 of yoke member 66 to be offset from a vertical centerline 100 of connecting sleeve 64 a distance D either to the right or the left. This capability enables a transverse change in the position of centerline 99 of yoke member 66 a total distance of 2 times D (2×D).

Figure 3:
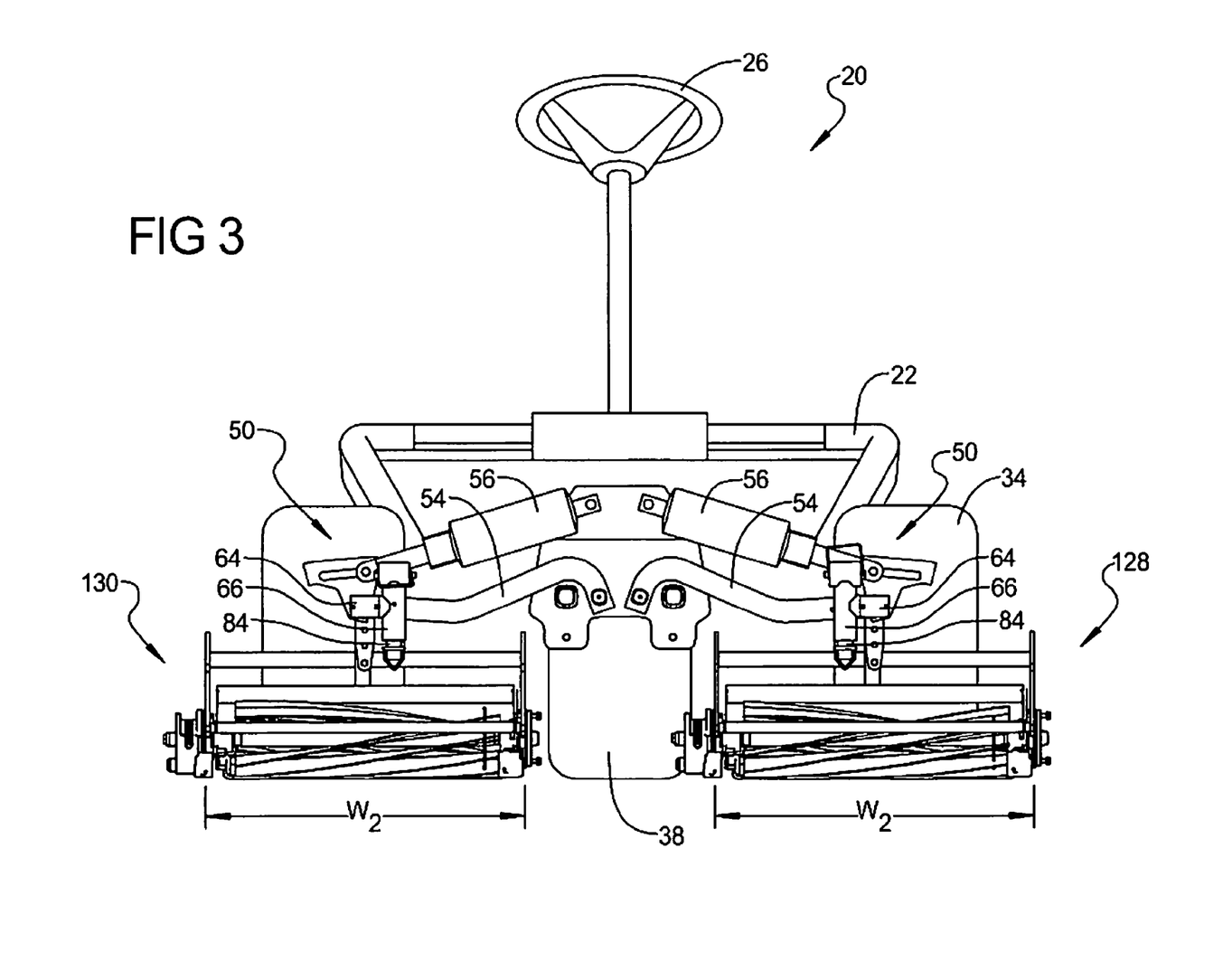
FIG. 3 is a simplified front plan view of the turf maintenance vehicle of FIG. 1 with various components removed and with a second pair of turf maintenance implements having a second width coupled thereto with the universal yoke.
Figure 4:
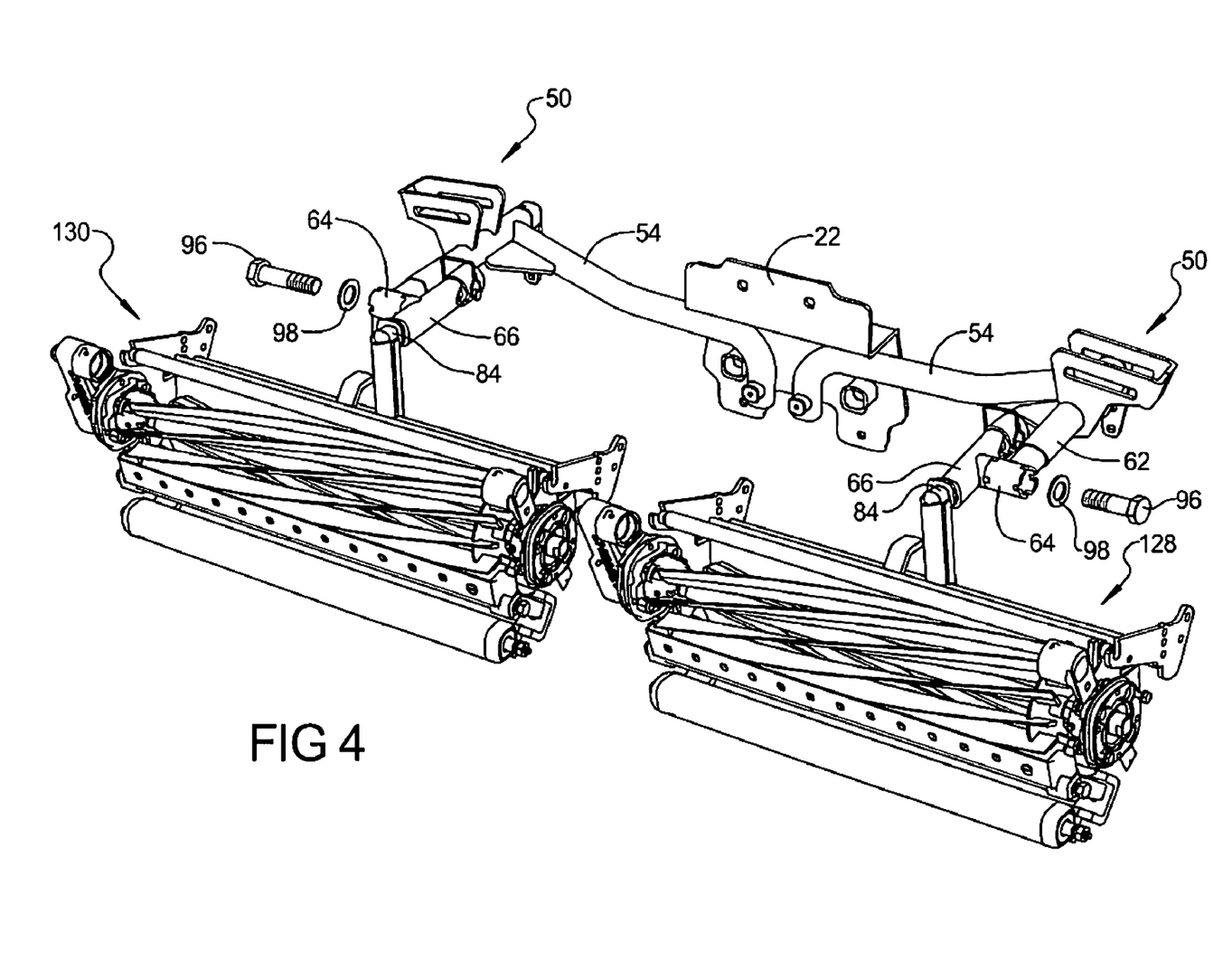
FIG. 4 is a simplified fragmented perspective view of the turf maintenance vehicle of FIG. 3 with additional components removed for clarity and with the turf maintenance implements in a service position.

Thus, an attachment assembly 50 according to the present teachings provides a universal fit-up wherein yoke member 66 can be connected to either end 64a, 64b of connecting sleeve 64 of connecting arm 60. This capability allows attachment assembly 50 to be a universal attachment assembly wherein implements of differing widths, such as widths $W_1$, $W_2$, can be coupled to mower assembly 20 in a desired position to accommodate differing turf care needs. The ability to attach yoke member 66 to either end 64a, 64b of connecting sleeve 64 accommodates the differing widths $W_1$, $W_2$ of the associated turf maintenance implement. For example, as shown in FIGS. 1 and 2, turf maintenance implements 28, 30 having width $W_1$ can be attached to mower assembly 20 via attachment assembly 50. In this case, yoke members 66 are coupled to the outboard sides of connecting sleeves 64 of connecting arms 60. When it is desired to attach turf maintenance implements 128, 130 having a smaller width $W_2$, as shown in FIGS. 3 and 4, yoke members 66 can be coupled to the inboard ends of connecting sleeves 64 of connecting arms 60. The distance D by which yoke member 66 is offset from connecting sleeve 64 can be selected to be one half of the difference in widths ($W_1 - W_2$) of the different turf maintenance implements by way of non-limiting example. The ability to attach turf maintenance implements of differing widths by coupling the yoke members 66 to either the outboard or inboard ends of connecting sleeves 64 allows the turf maintenance implements to be properly aligned relative to mower assembly 20 for their associated widths and also with the rear turf maintenance implement (shown in FIG. 1 only). In this manner, a user of mower assembly 20 can switch between turf maintenance implements of varying widths while still using the same mower assembly 20. This ability allows the user to quickly switch between different turf maintenance implements to perform differing tasks. For example, the user can use turf maintenance implements of one width for relatively flat greens and fairways while using turf maintenance implements of a smaller width for undulating greens. The ability to easily and quickly switch between turf maintenance implements of different widths reduces the time and labor costs associated with turf care.

Referring now to FIG. 4, attachment assembly 50 also enables the positioning of turf maintenance implements in a service position. Specifically, notches 72 in yoke member 66 engage with notches 74 of connecting sleeve 64 to prevent relative rotation therebetween. The location of and spacing of notches 72, 74 can be set to allow yoke member 66 to be disposed in specific orientations relative to connecting sleeve 64. When it is desired to utilize the turf maintenance implements for their intended function, yoke member 66 can be secured to connecting sleeve 64 such that it extends generally vertically, as shown in FIGS. 1-3. When it is desired to service the attached turf maintenance implement, yoke member 66 can be detached from connecting sleeve 64 such that the associated notches 72, 74 are disengaged and rotated relative thereto to a generally horizontal orientation, as shown in FIG. 4. Yoke member 66 can then be re-secured to connecting sleeve 64 with bolt 96 and washer 98. In this position, yoke member 66 and attachment assembly 50 can hold the associated turf maintenance implement in a service position. For example, such service position may be desirable to facilitate the sharpening of the turf maintenance implements, making adjustments, replacing parts, or other service procedures. The spacing and positioning of notches 72, 74 can be set to provide desired orientations between yoke member 66 and connecting sleeve 64. Thus, an attachment assembly 50 according to the present teachings can advantageously facilitate the attachment of a turf maintenance implement to mower assembly 20 in both an operative position and a service position.

Figure 8:
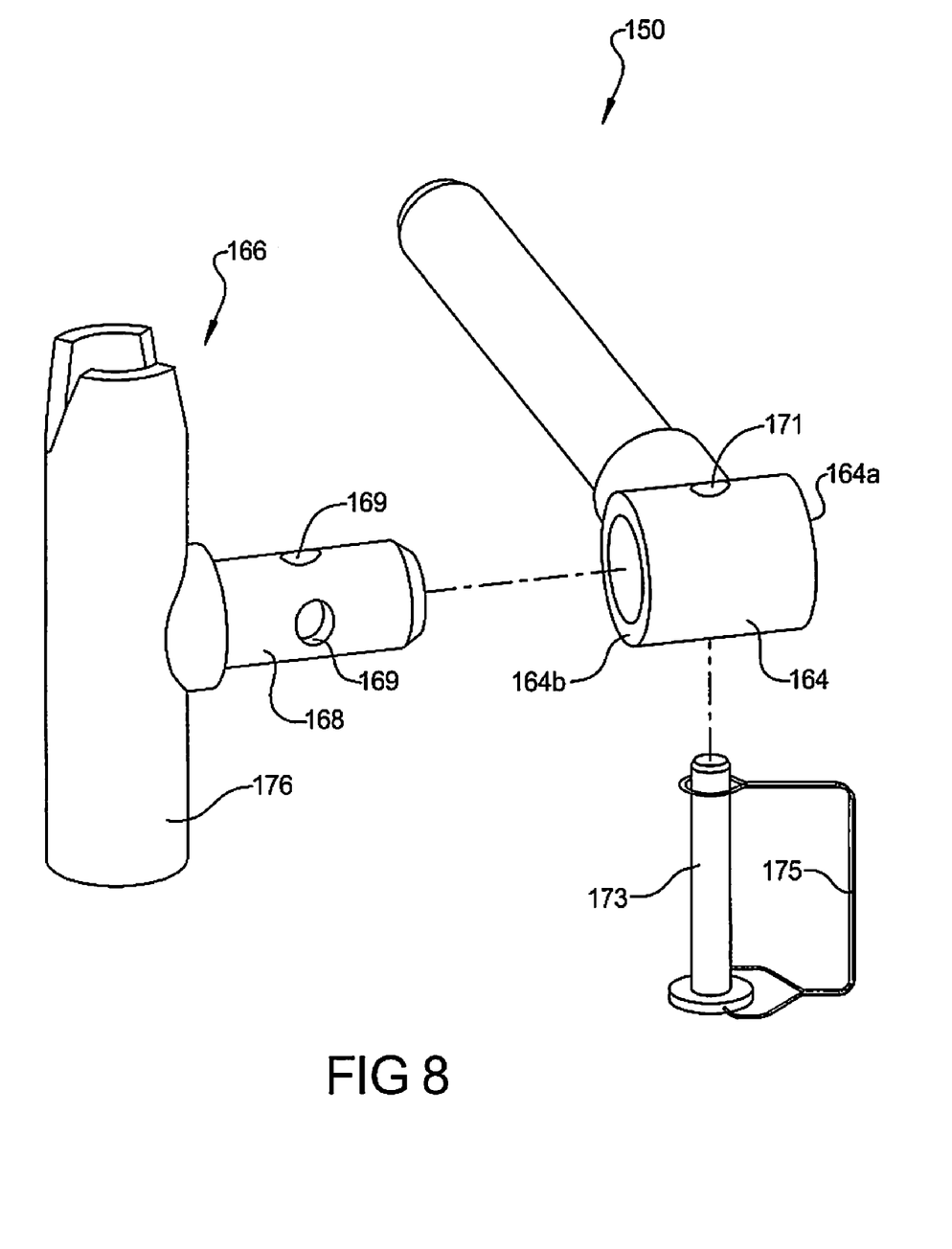
FIG. 8 is a perspective view of an alternate universal yoke according to the present teachings.

Referring now to FIG. 8, an alternate embodiment of a universal attachment assembly 150 according to the present teachings is shown. Attachment assembly 150 is similar to attachment assembly 50 described above. Accordingly, only the main differences will be described and it should be appreciated that not all details of attachment assembly 150 are described herein. In attachment assembly 150, ends 164a, 164b of connecting sleeve 164 do not contain notches. Rather, these ends are relatively flat. To prevent relative rotation between yoke member 166 and connecting sleeve 164, insertion extension 168 includes a plurality of through openings 169 that are radially spaced around insertion extension 168. Additionally, connecting sleeve 164 includes a vertically extending through opening 171 that can align with through openings 169 on insertion extension 168. A locking pin 173 can be inserted through openings 171, 169 in connecting sleeve 164 and yoke member 166, respectively, and secured in place with a clip 175. Locking pin 173 can thereby prevent relative rotation between yoke member 166 and connecting sleeve 164 while also preventing removal of yoke member 166 from connecting sleeve 164. Again, yoke member 166 can be inserted into connecting sleeve 164 through either end 164a, 164b to thereby allow a universal connection and ability to attach turf maintenance implements of differing widths. The plurality of openings 169 in insertion extension 168 allows yoke member 166 to be secured to connecting sleeve 164 in a variety of orientations, such as with receiving sleeve 176 vertically or horizontally oriented. In this manner, attachment assembly 150 enables the turf maintenance implements secured therewith to be disposed in an operating position and in a service position, as discussed above.

Figure 9:
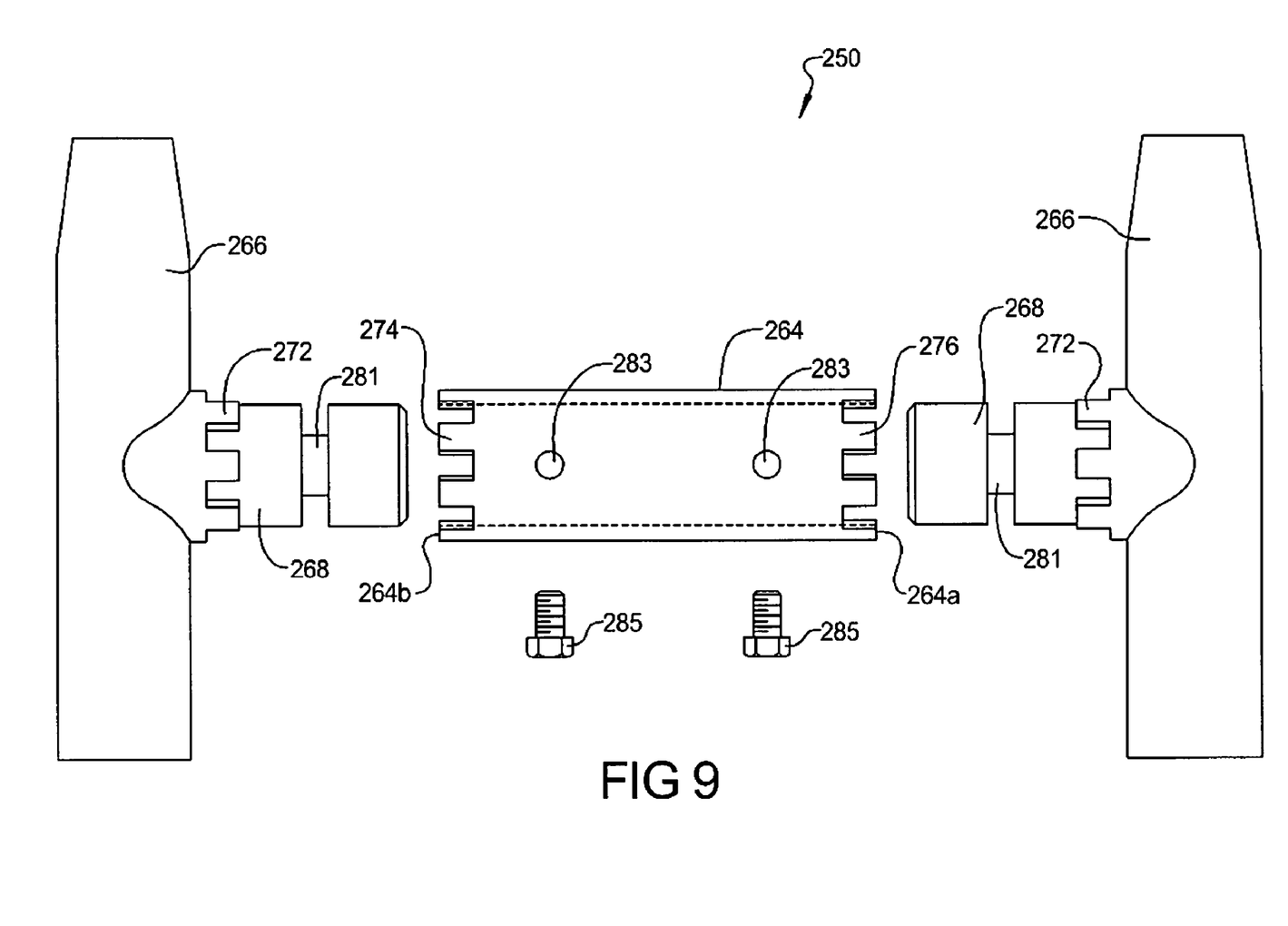
FIG. 9 is an assembly view of another alternate universal yoke according to the present teachings having two pivot arms operable to be installed simultaneously.

Referring now to FIG. 9, another alternate embodiment of a universal attachment assembly 250 according to the present teachings is shown. Attachment assembly 250 is similar to attachment assembly 50 described above. Accordingly, only the main differences will be described and it should be appreciated that not all details of attachment assembly 250 are described herein. Attachment assembly 250 again allows attachment of a yoke member 266 to either end 264a, 264b of a connecting sleeve 264. In addition, attachment assembly 250 enables two separate yoke members 266 to be secured to the opposite ends of connecting sleeve 264 at the same time. In attachment assembly 250, insertion extensions 268 include a recessed annular groove 281 that generally aligns with an opening 283 in connecting sleeve 264 when inserted therein. Opening 283 can be threaded and can be dimensioned to receive a threaded member 285, such as a bolt or set screw. Threaded member 285 can be dimensioned to be received in groove 281 of insertion extension 268 when disposed in connecting sleeve 264. Threaded member 285 can thereby secure yoke member 266 to connecting sleeve 64 and prevent removal therefrom. To prevent relative rotation, yoke member 266 includes a plurality of notches 272 that engage with notches 274 on the ends of connecting sleeve 264. Thus, in attachment assembly 250, two yoke members 266 can be simultaneously secured to connecting sleeve 264 with threaded members 285, while the engagement of notches 272, 274 prevents relative rotation. Notches 272, 274 allow the turf maintenance implements to be attached to mower assembly 20 in an operative position and in a service position, as described above. The simultaneously retention of two yoke members 266 may facilitate quicker and easier changeover of turf maintenance implements of differing widths.

Thus, it should be appreciated that attachment assemblies 50, 150, 250 according to the present teachings can advantageously allow the attachment of turf maintenance implements of varying widths to mower assembly 20, while providing the desired orientation of the turf maintenance implements relative to mower assembly 20. The ability to attach the same yoke member 66, 166, 266 to either end of an associated connecting sleeve 64, 164, 264 facilitates the easy installation of turf maintenance implements of varying widths. Moreover, the connections between yoke members 66, 166, 266 and the associated connecting sleeves 64, 164, 264 allow for the easy relocation to either end of the connecting sleeve. Additionally, the attachment assemblies 50, 150, 250 also enable turf maintenance implements to be attached to mower assembly 20 in both an operative position and a service position.

Figure 10:
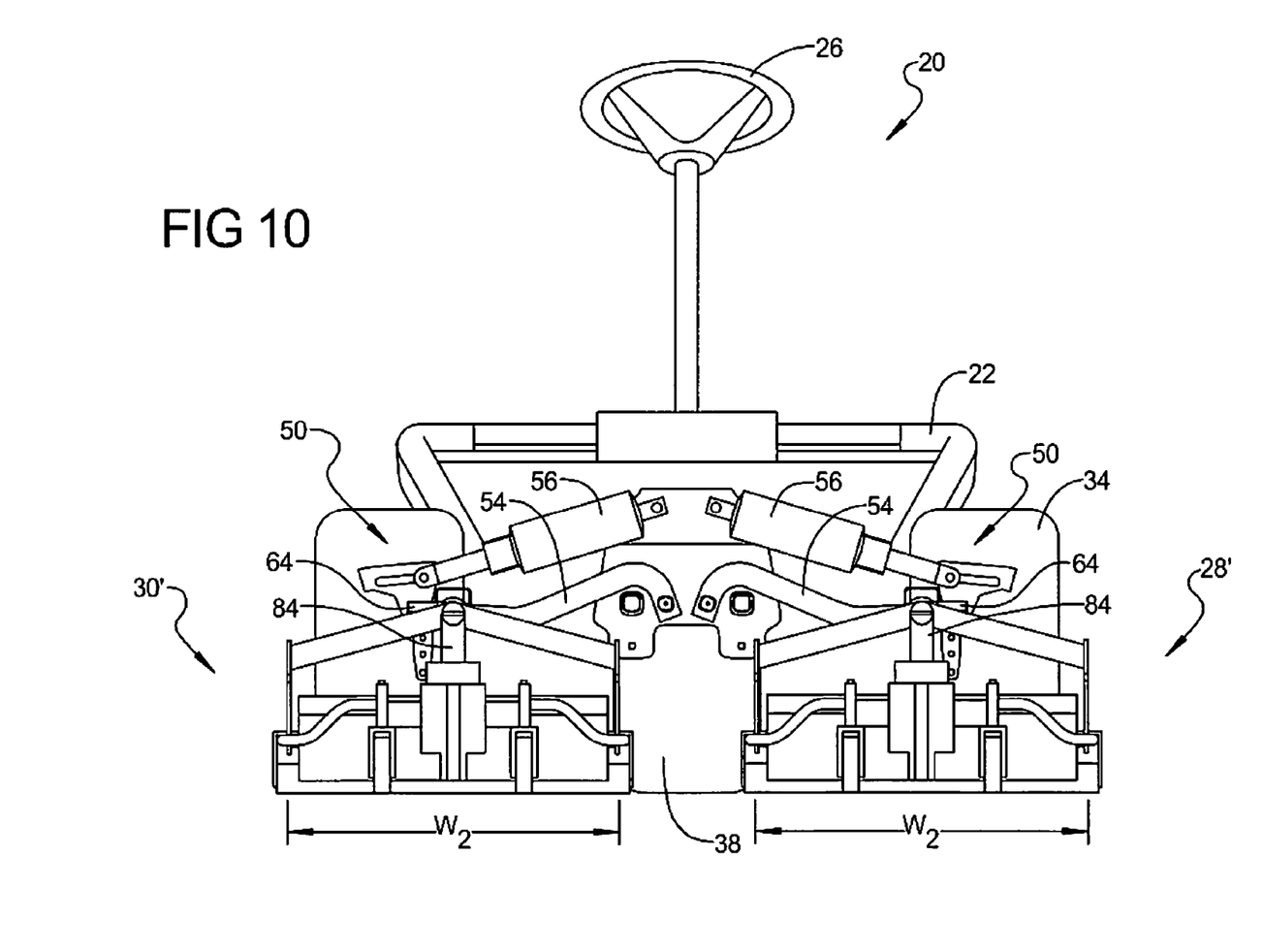
FIG. 10 is a view similar to FIG. 3 wherein the turf maintenance implement is a rotary deck mower implement.

While the present teachings have been described with reference to specific examples and illustrations, it should be appreciated that changes can be made without departing from the spirit and scope of the present teachings. For example, turf maintenance implements other than cutting units can be attached to mower assembly 20 with the attachment assemblies according to the present teachings. By way of non-limiting example, the turf maintenance implements can include groomers, power brushes, vertical-cutting accessories, and/or combinations thereof. Furthermore, as shown in FIG. 10, attachment assembly 50 can be used to secure a rotary type turf maintenance implement 28', 30', 32' in the form of rotary mowing decks. It should be appreciated, however, that other types of rotary turf maintenance implements can also be used with the attachment assemblies according to the present teachings. Additionally, the number and locations of the attachment assemblies can also vary. For example, an attachment assembly according to the present teachings can be utilized to secure a rear turf maintenance implement to mower assembly 20, by way of non-limiting example. Additionally, it should be appreciated that the various features disclosed in attachment assemblies 50, 150, 250 can be intermixed with one another to achieve a desired operational capability for the attachment assembly. For example, attachment assemblies 50, 150 can be dimensioned to allow the simultaneous attachment of two yoke members thereto, if desired. Moreover, attachment assemblies 50, 250 can be modified to utilize a locking pin and clip to prevent relative rotation, if desired. Accordingly, such alteration and changes should be regarded as being within the spirit and scope of the present teachings.

What is claimed is:

1. An attachment assembly for a turf maintenance vehicle, the attachment assembly comprising:
    a yoke member having first and second connecting features, the first connecting feature operable to connect the yoke member to a turf maintenance implement; and
    a coupling member operable to couple the yoke member to a frame assembly, the coupling member including a first attachment feature that can be coupled to the frame assembly and a second attachment feature engaging with the second connecting feature thereby coupling the yoke member to the coupling member, the second attachment feature allowing the yoke member to be coupled to the coupling member in at least two positions, a first one of the at least two positions corresponding to the yoke member being in a first orientation relative to the coupling member and a second one of the at least two positions corresponding to the yoke member being in a second orientation relative to the coupling member, the second orientation being different than the first orientation,
    wherein the yoke member is disposed on a first side of the coupling member when in the first position and is disposed on a second side of the coupling member when in the second position, and wherein the first and second sides are opposing sides, the second attachment feature includes an opening in the coupling member that extends between the first and second sides, the second connecting feature includes an insertion member that can be received in the opening, the first position corresponds to the insertion member being inserted into the opening through the first side, and the second corresponds to the insertion member being inserted into the opening through the second side.

2. The attachment assembly of claim 1, further comprising a retainer retaining the insertion member in the opening in the coupling member.

3. The attachment assembly of claim 2, wherein an end of the insertion member includes a threaded bore and the retainer includes a threaded fastener that engages with the threaded bore and retains the yoke member secured to the coupling member.

4. The attachment assembly of claim 2, wherein the insertion member includes a through opening and the retainer includes a pin that extends through the coupling member and through the opening in the insertion member thereby retaining the yoke member secured to the coupling member.

5. The attachment assembly of claim 2, wherein the insertion member includes an annular groove and the retainer includes an elongated member that extends through a portion of the coupling member and engages with the groove thereby retaining the yoke member secured to the coupling member.

6. The attachment assembly of claim 2, wherein the retainer prevents the yoke member from being uncoupled from the coupling member while allowing relative rotation therebetween.

7. The attachment assembly of claim 1, further comprising a retaining member engaging with the yoke member and with the coupling member, the retaining member securing the yoke member to the coupling member.

8. The attachment assembly of claim of claim 7, wherein the retaining member prevents relative rotation between the yoke member and the coupling member.

9. The attachment assembly of claim 8, wherein the retaining member allows the yoke member to be disposed in multiple discrete positions relative to the coupling member.

10. The attachment assembly of claim 1, wherein the yoke member is rotated relative to the coupling member after being decoupled from the coupling member to move between the first and second positions.

11. The attachment assembly of claim 10, wherein the first position corresponds to an attached turf maintenance implement being in an operative position and the second position corresponds to an attached turf maintenance implement being in a serviceable position.

12. The attachment assembly of claim 1, wherein the yoke member is offset from the coupling member in a first direction when in the first position, the yoke member is offset from the coupling member in a second direction when in the second position, and the second direction is opposite the first direction.

13. The attachment assembly of claim 1, wherein a centerline of the first connecting feature of the yoke member is offset from a reference line of the coupling member a first and second distance when in the respective first and second positions, and the first and second distances are substantially the same.

14. The attachment assembly of claim 1, wherein the second attachment feature and the second connecting feature include complementary teeth that engage and prevent relative rotation between the yoke member and the coupling member when in either one of the first and second positions.

15. The attachment assembly of claim 1, wherein the first connecting feature includes a bore extending through the yoke member and operable to receive a component of a turf maintenance implement to retain the turf maintenance implement to the yoke member.

16. The attachment assembly of claim 1, wherein the yoke member can be moved between third and fourth positions when in either one of the first and second positions, the third and fourth positions being different positions relative to the coupling member.

17. An attachment assembly for a turf maintenance vehicle, the attachment assembly comprising:
a yoke member having first and second connecting features, the first connecting feature operable to connect the yoke member to a turf maintenance implement; and
a coupling member operable to couple the yoke member to a turf maintenance vehicle frame assembly, the coupling member including a first attachment feature that can be coupled to the turf maintenance vehicle frame assembly and a second attachment feature engaging with the second connecting feature thereby coupling the yoke member to the coupling member;
wherein the second attachment feature and the second connecting feature allow the yoke member to be coupled to the coupling member at two different locations on the coupling member and in at least two different orientations at each of the two locations, the second connecting feature includes an elongated insertion member and the second attachment feature includes at least one bore in the coupling member and wherein the insertion member is received in the at least one bore to secure the yoke member to the coupling member,
a retaining member operable to retain the yoke member to the coupling member and wherein the insertion member includes a first opening, the coupling member includes a second opening, and the first and second openings can be aligned when the insertion member is disposed in the at least one bore, and the retaining member engages with the first and second openings to secure the yoke member to the coupling member.

18. The attachment assembly of claim 17, wherein the retaining member prevents the yoke member from rotating relative to the coupling member.

19. The attachment assembly of claim 17, wherein the two different locations are on opposite sides of the coupling member.

20. The attachment assembly of claim 19, wherein a centerline of the first connecting feature of the yoke member is offset from a reference line of the coupling member a same distance when in either one of the two different locations.

21. The attachment assembly of claim 17, wherein the yoke member rotates relative to the coupling member to move between the at least two different orientations upon being decoupled from the coupling member.

22. The attachment assembly of claim 17, wherein the second attachment feature and the second connecting feature include complementary teeth that engage to secure the yoke member in the at least two different orientations and prevent relative rotation between the yoke member and the coupling member when in either one of the two different locations.

23. The attachment assembly of claim 17, wherein a first one of the at least two orientations corresponds to an attached turf maintenance implement being in an operative position and a second one of the at least two orientations corresponds to an attached turf maintenance implement being in a serviceable position.

24. The attachment assembly of claim 17, wherein the coupling member can simultaneously receive and retain two yoke members with one yoke member in each of the two different positions.

25. A turf maintenance vehicle comprising:
a frame assembly;
a power unit coupled to the frame assembly;
at least two wheels coupled to the frame assembly; and
an attachment assembly operable to couple turf maintenance implements of varying widths to the frame assembly, the attachment assembly including:
a yoke member having first and second connecting features, the first connecting feature operable to connect the yoke member to a turf maintenance implement; and
a coupling member operable to couple the yoke member to the frame assembly, the coupling member including a first attachment feature coupling the coupling member to the frame assembly and a second attachment feature engaging with the second connecting feature thereby coupling the yoke member to the coupling;
a retaining member engaging with the yoke member and with the coupling member, the retaining member securing the yoke member to the coupling member, wherein the retaining member prevents relative rotation between the yoke member and the coupling member,
wherein the second attachment feature allows the yoke member to be coupled to the coupling member in at least two positions, a first one of the at least two positions corresponding to the yoke member being in a first orientation relative to the coupling member and a second one of the at least two positions corresponding to the yoke member being in a second orientation relative to the coupling member, the second orientation being different than the first orientation.

26. The turf maintenance vehicle of claim 25, wherein the retaining member allows the yoke member to be disposed in multiple discrete positions relative to the coupling member.

27. The turf maintenance vehicle of claim 25, wherein upon being decoupled from the coupling member, the yoke member is rotated relative to the coupling member to move between the first and second positions.

28. The turf maintenance vehicle of claim 27, wherein the first position corresponds to an attached turf maintenance implement being in an operative position and the second position corresponds to an attached turf maintenance implement being in a serviceable position.

29. The turf maintenance vehicle of claim 25, wherein the second attachment feature and the second connecting feature include complementary teeth that engage and prevent relative rotation between the yoke member and the coupling member when in either one of the first and second positions.

30. The turf maintenance vehicle of claim 29, wherein engagement of the complementary teeth allow the yoke member to be disposed in multiple orientations relative to the coupling member.

31. The turf maintenance vehicle of claim 25, wherein:
the coupling member includes opposing first and second sides and the second attachment feature includes an opening in the coupling member that extends between the first and second sides;
the second connecting feature includes an insertion member that can be received in the opening; and
the first position corresponds to the insertion member being inserted into the opening through the first side with the majority of the yoke member disposed on the first side and the second position corresponds to the insertion member being inserted into the opening through the second side with the majority of the yoke member disposed on the second side.

32. The turf maintenance vehicle of claim 25, wherein a centerline of the first connecting feature of the yoke member is offset from a reference line of the coupling member a first and second distance when in the respective first and second positions, and the first and second distances are substantially the same.

33. The turf maintenance vehicle of claim 25, wherein the yoke member can be decoupled from the coupling member and rotated between third and fourth positions when in either one of the first and second positions, the third and fourth positions being different positions relative to the coupling member.

* * * * *